C. W. CUNNINGHAM.
CLAMP OPERATING DEVICE FOR MEAT SKINNING MACHINES
APPLICATION FILED AUG. 6, 1914.
1,111,953.
Patented Sept. 29, 1914.
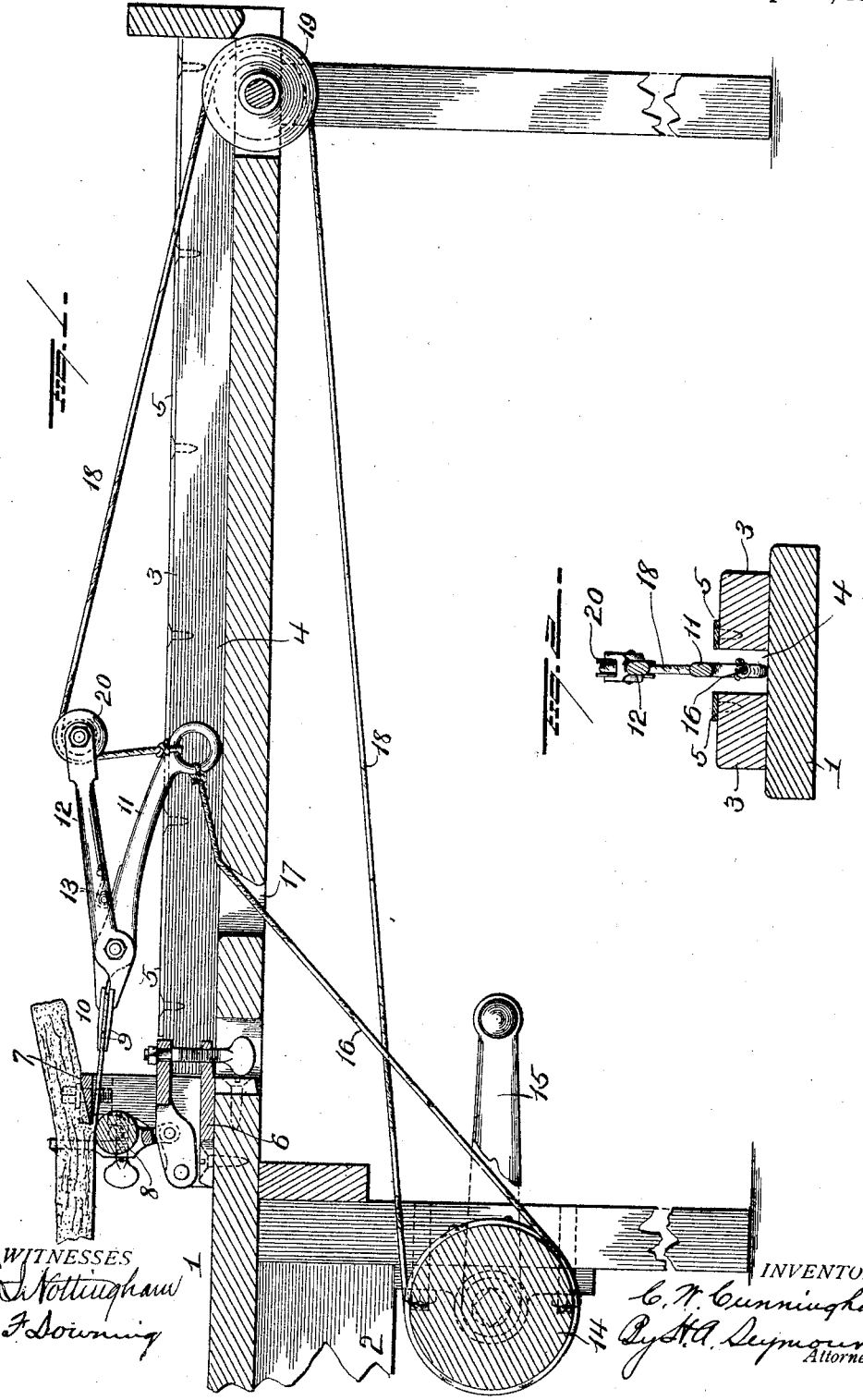

UNITED STATES PATENT OFFICE.

CLINTON W. CUNNINGHAM, OF BALTIMORE, MARYLAND, ASSIGNOR TO KINGAN & COMPANY, LIMITED, OF INDIANAPOLIS, INDIANA, A CORPORATION OF GREAT BRITAIN.

CLAMP-OPERATING DEVICE FOR MEAT-SKINNING MACHINES.

1,111,953.      Specification of Letters Patent.      Patented Sept. 29, 1914.

Original application filed May 26, 1914, Serial No. 841,115. Divided and this application filed August 6, 1914. Serial No. 855,467.

*To all whom it may concern:*

Be it known that I, CLINTON W. CUNNINGHAM, a citizen of the United States, and a resident of Baltimore, in the State of Maryland, have invented certain new and useful Improvements in Clamp-Operating Devices for Meat-Skinning Machines; and I do hereby declare the following to be a full, clear, and exact description of the invention, such as will enable others skilled in the art to which it appertains to make and use the same.

This invention relates to improvements in meat skinning machines and more particularly to the clamp and operating devices therefor, by means of which the meat is pulled past the cutting means, this application being a division of application for patent filed by me on the 26th day of May, 1914, and designated by Serial No. 841,115.

One object of the invention is to provide simple and efficient devices for moving the clamp and to construct and arrange such devices, that the greater the resistance which may be offered to the movement of the meat past the cutter, the tighter the clamp will be applied.

A further object is to so construct and arrange clamp operating mechanism that the clamp may be manually operated to cause the meat clamp to travel over a table away from the cutting means, or returned to proximity to the cutting means.

With these and other objects in view, the invention consists in certain novel features of construction and combinations of parts as hereinafter set forth and pointed out in the claims.

In the accompanying drawings; Figure 1 is a longitudinal sectional view of a meat skinning machine embodying my improvements and Fig. 2 is a transverse sectional view.

1 represents a table supported by suitable framework 2 and having upon its upper face, two parallel strips 3, spaced apart to form a groove or guideway 4 between them, said strips being provided on their upper faces with wear plates 5. At one end of the guide strips, a frame 6 is located and supports a blade 7 and guide devices 8 for the meat to be skinned.

It is customary to sever a small portion of the skin at one end of the piece of bacon before subjecting the latter to the machine and then place the piece of bacon in the position substantially as shown in Fig. 1, with the body of the meat disposed over the blade and the severed end of the skin under said blade. The projecting end of the skin will then be caused to be grasped between the jaws 9 of a clamp 10. This clamp comprises two levers 11—12 pivotally connected together, and a spring 13 tends to close the jaws 9. These jaws are sufficiently elongated to grasp the skin of a piece of bacon substantially from one edge to the other thereof and when the clamp is moved to effect the skinning operation or to return to position near the blade, said jaws may ride upon the wear plates 5 on the strips 3, while the free end of the lever 11 may move in the groove or guideway formed between said strips.

A drum 14 is mounted in suitable bearings on the framework below the plane of the table 1 and is provided with a suitable manually operable crank 15. A rope 16, or equivalent flexible device, is wound upon the drum 14 and after passing through a hole 17 in the table, is secured to the free end of the lever 11 of the clamp. Another rope 18 or equivalent flexible device, is wound in the reverse direction upon the drum 14 and extends therefrom to the far end of the table where it passes over a pulley 19 mounted in a suitable opening in the table. From the pulley 19, the rope 18 extends forwardly and after passing over a pulley 20 mounted at the free end of lever 12 of the clamp 10, is secured to the free end of clamp lever 11.

It will be observed that when the bacon is positioned and the skin thereof is grasped by the jaws of the clamp as shown in Fig. 1, rotation of the drum 14 in one direction will cause the jaws of the clamp to tighten their grip upon the bacon skin and the clamp will be moved bodily, thus pulling the bacon past the blade and effecting the clean severance of the skin. By rotating the drum in the reverse direction, the clamp will be returned to position to be engaged with the skin of another piece of bacon.

Slight changes might be made in the details of construction of my invention, without departing from the spirit thereof or limiting its scope and hence I do not wish to restrict myself to the precise details herein set forth.

Having fully described my invention what I claim as new and desire to secure by Letters Patent, is:—

1. The combination with a frame, of a clamp movable thereon, said clamp comprising two pivoted levers carrying jaws, a drum mounted in the frame, a rope wound on said drum and connected with one of the clamp ends, and another rope wound on the drum and movably connected with the other clamp lever and secured to the first-mentioned clamp lever.

2. The combination with a frame, of a clamp movable thereon and comprising pivoted levers provided with jaws, a drum mounted in the frame, a rope wound on said drum and secured to one of the clamp levers, a pulley mounted in the frame, another rope wound in the reverse direction upon said drum, said last-mentioned rope passing over the pulley in the frame and then movably connected with the other clamp levers and fixed to the first-mentioned clamp lever.

3. The combination with a frame, of a clamp comprising hinged levers and jaws on said levers, a drum, a rope wound on the drum and connected with one of the clamp levers, another rope wound in the opposite direction on said drum and secured to the same clamp lever, a pulley on the other clamp lever over which said last-mentioned rope passes, and a pulley supported by the frame intermediate of the drum and the clamp, over which the last-mentioned rope passes.

4. The combination with a table provided with a guideway and wear plates at respective sides of said guideway, of a clamp comprising pivoted levers provided with elongated jaws movable on said wear plates, a drum, a rope wound on said drum and secured to one of the clamp levers, a pulley at the far end of the guideway, another rope wound in the opposite direction on said drum and passing over said pulley, said last mentioned rope secured to the first-mentioned clamp lever and movably connected with the other clamp lever.

In testimony whereof, I have signed this specification in the presence of two subscribing witnesses.

CLINTON W. CUNNINGHAM.

Witnesses:
 EDW. J. SHARPLEY,
 J. LOGAN DUNCAN.